UNITED STATES PATENT OFFICE.

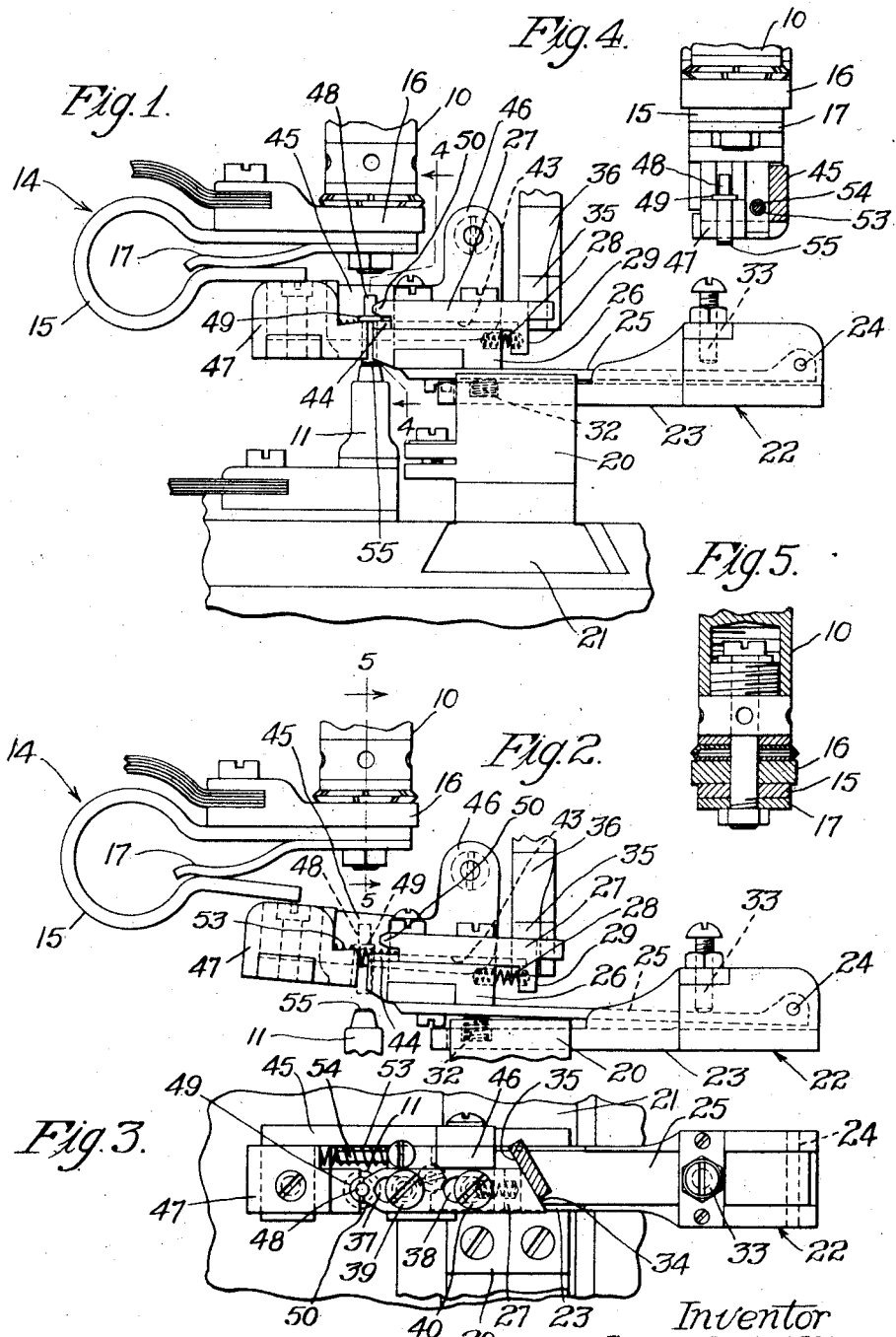

JAMES T. GRIFFIN, OF OAK PARK, ILLINOIS, ASSIGNOR TO WESTERN ELECTRIC COMPANY, INCORPORATED, OF NEW YORK, N. Y., A CORPORATION OF NEW YORK.

WELDING MECHANISM.

1,360,288.  Specification of Letters Patent.  Patented Nov. 30, 1920.

Application filed April 29, 1920. Serial No. 377,483.

*To all whom it may concern:*

Be it known that I, JAMES T. GRIFFIN, a citizen of the United States, residing at Oak Park, in the county of Cook and State of Illinois, have invented certain new and useful Improvements in Welding Mechanism, of which the following is a full, clear, concise, and exact description.

This invention relates to welding mechanism, and more particularly to an attachment or fixture for use in welding contact elements to studs or like fixtures.

The object of this invention in general is to provide a mechanism by means of which a thorough and reliable weld may be produced between a metal stud and a contact element without the exercise of any particular degree of skill on the part of the operator after the adjustments have once been made.

In accordance with one of the features of this invention means are provided for producing a follow-up pressure as soon as the metals to be welded begin to soften to cause an intimate amalgamation of the metals without flashing of the contact metal. In accordance with this feature of the invention spring means are provided in connection with the reciprocating member of the welding apparatus adapted to have energy stored in it as the reciprocating member moves toward the work piece, which energy is released at a critical period as the metals begin to fuse to push the parts together intimately.

Another feature of this invention relates to the details of construction of the fixture for gripping the stud between its ends for moving it into welding relation with the contact elements. In accordance with this feature of the invention a movable holder comprises two sections which are hinged with respect to each other and are adapted to be moved together to firmly clamp the stud in welding position and in such a manner that the current through the stud will be over a path of comparatively low resistance. A spring is provided between the hinged elements for automatically opening them when the pressure of the reciprocating member has been released, thereby permitting the ejectment of the stud from between them.

Figure 1 is a view in front elevation of the complete welding fixture in its operated position shown mounted in place on the supporting portions of a welding machine;

Fig. 2 is a similar view with the parts shown in their normal position;

Fig. 3 is a plan view of the work carrier in the position shown in Fig. 1;

Fig. 4 is a vertical section taken on the line 4—4 of Fig. 1, and

Fig. 5 is a vertical section taken on the line 5—5 of Fig. 2 showing the manner of mounting the spring electrode on the electrode plunger.

This fixture is preferably used with a type of welding machine shown and described in Patent 1,090,618 to W. F. Hosford, dated March 17, 1914, and to which a reference may be had for a description of the driving mechanism.

As shown in the drawings, 10 represents an electrode plunger actuated in the manner described in the aforesaid patent. Mounted from the base of the machine and directly under the center of the electrode plunger 10 and suitably insulated therefrom is a lower electrode 11. Detachably secured to the electrode carrier 10 is a spring electrode 14 consisting of a U-shaped member 15 secured to a terminal block 16 with a steel leaf spring 17 located between the upper and lower arms thereof. The spring 17 is secured to the upper arm of the member 15 with its free end bearing on the lower arm thereof. The member 15 and terminal block 16 are preferably of copper.

A carrier block 20 suitably secured to a slide 21 which is adapted to be given a reciprocating motion as described in the referred to patent mounts a work support or carrier 22. The work support 22 consists of a main supporting plate 23 upon which is pivoted at 24 a supporting arm 25. The arm 25 supports at its end opposite the pivot 24 a detachable block 26 which carries thereon a slidable holding member 27 which is held in its normal position by a spring 28 which is suitably mounted in recesses in the block 26 and a downwardly extending lug 29 on the holding member 27. A spring 32 positioned in a suitable recess in the plate 23 with one end bearing against the under side of the arm 25 at the end thereof opposite the pivot 24 keeps the arm 25 in its normal position, its movement upward being limited by an adjustable stop screw 33 suitably secured to the plate 23.

One end of the holding member 27 is provided with a vertical cam face 34 which engages a stationary cam face 35 on a lug 36 suitably supported from the frame of the machine when the work support is moved back after being loaded. The member 27 is provided with slots 37 and 38 through which pass screws 39 and 40 which are fastened in the block 26 but which allow a longitudinal movement of the member 27 thereon. A keyway 43 in the member 27 registering with a raised portion or key 44 on the block 26 guides the member 27 in its movement thereon.

An arm 45 is pivoted at one end to an upwardly extending lug 46 secured to the block 26 and detachably carries at its other end a clamping block 47 which serves to hold a work piece 48 in position between it and the block 26 during the welding operation. The work piece 48 which is to have a contact welded to its lower end rests between recesses formed in the members 26 and 47 with the slidable holding member 27 serving to secure the work piece 48 from vertical movement while clamped between the members 26 and 47. An enlargement or shoulder 49 on the work piece 48 passing under a recessed and tapered end 50 of the member 27 during the downward movement of the electrode plunger 10 serves to hold the work piece from vertical movement during the welding operation.

A spring held in position by a stud 54 secured in the block 26 with its other end resting against the clamping block 47 serves to swing the pivoted arm 45 about its pivot to its normal position, as shown in Fig. 2.

When welding a contact to a work piece of different shape or size than the work piece 48 the detachable portions 26 and 47 of the members 25 and 45 can be removed along with the slidable holding member 27 and others substituted to fit the work piece.

A contact disk 55 which is to be welded to the work piece 48 is fed to the top surface of the lower electrode 11 at the proper time in the operation of the machine in the manner described in the aforesaid Patent 1,090,618.

In the operation of this invention the parts are shown in Fig. 2 in their normal position with the work piece 48 which is to have the contact disk 55 welded thereto shown in dotted lines. At this time the work support is in its forward or loading position and the operator places a work piece 48 between the members 26 and 47, or it may be fed automatically therebetween, with the shouldered portion 49 thereof resting on the block 47. The next operation of the machine moves the work support back with the work piece 48 to a position directly in line with the electrode plunger 10 and the lower electrode 11. In the movement backward of the work support the cam face 34 on the slidable holding member 27 rides against the stationary cam face 35 on the leg 36 and slides the holder 27, thereby moving the tapered end 50 thereof over the shouldered portion 49 of the work piece and locking it from vertical movement relative to the members 26 and 47. During the movement of the work support rearward to a position which locates the work piece between the upper and lower electrodes a contact disk 55 is fed to the top surface of the lower electrode 11. The electrode plunger 10, the raising and lowering of which may be controlled in the manner described in the aforesaid patent, is then lowered.

It will be noted by referring to Fig. 2 that one end of the U-shaped member 15 when in its expanded condition is very close to being engaged by the block 47 after the work support moves back and before the electrode plunger moves down. This is for the purpose of allowing the block 47 to pass under it after the work support is loaded. The movement of the electrode plunger 10 downward causes the U-shaped member 15 to engage the block 47 carried by the arm 45 and turn it about its pivot against the action of the spring 53. As the electrode plunger 10 continues to move down, the work piece 48 is clamped between the members 26 and 47 with the arm 25 being turned about its pivot 24 against the action of the spring 28 and bringing the lower end of the work piece into contact with the disk 55.

By the time the electrode plunger 10 has reached its lowermost position the free ends of member 15 and spring 17 have been moved upward, as shown in Fig. 1, thereby storing energy in the spring 17. At this time the circuit of the primary of the transformer is momentarily closed, and the circuit of the secondary being closed through the work piece 48 and the disk 55, the disk is welded to the work piece.

During the welding of the work piece to the contact disk there occurs a slight movement downward of the work piece 48 relative to the contact disk 55 due to the flow of metal at the welding point. It is necessary at this time if the work piece 48 is of brass that it be moved quickly and with suitable pressure downward against the contact disk 55 to prevent flashing of the contact metal which would take place if the pressing together of the parts was not done quickly. The energy stored in the spring 17 which is close to the welding point provides for this instantaneous and suitable pressure in conjunction with the movement downward of the electrode plunger 10. By the use of the spring electrode 14 either brass or nickel silver may be welded to contact metal with a perfect fusing of the parts.

By the arrangement of the clamping means for gripping the stud between its ends the resistance of the path for the flow of the current is reduced to a minimum, and the maximum flow of current is produced at the point where it will be most effective.

What is claimed is:

1. In a mechanism for welding contact elements to studs, a stationary electrode adapted to receive the contact element, a movable clamping member for the stud, a reciprocating member for moving the stud and the contact element into engagement, and means interposed between the clamping member and the reciprocating member for exerting a follow-up pressure between the stud and the contact member upon the fusion of the metals.

2. In a mechanism for welding contact elements to studs, a stationary electrode adapted to receive the contact element, a movable clamping member for the stud, a reciprocating member for moving the stud and the contact element into welding engagement, and spring operated means interposed between the clamping member and the reciprocating member for exerting a follow-up pressure between the stud and the contact element upon the softening of the metals to be welded.

3. In a mechanism for welding contact elements to studs, a stationary electrode adapted to receive the contact element, a movable clamping element for the stud, a reciprocating member, and a spring member interposed between the reciprocating member and the clamping member and tensioned by the forward movement of the reciprocating member to exert a follow-up pressure between the stud and the contact element upon the softening of the metals to be welded.

4. In a mechanism for welding contact elements to studs, a stationary electrode adapted to receive the contact element, a movable clamping element for the stud, a reciprocating member, and a spring conducting member carried by the lower end of the reciprocating member and adapted to engage the movable clamping member to move the stud and contact into welding engagement, said spring being tensioned by the downward movement of the reciprocating member to exert a follow-up pressure between the stud and the contact member upon the softening of the metals to be welded.

5. In a mechanism for welding contact elements to studs, a stationary electrode adapted to receive the contact element, a movable clamping member adapted to grip the stud between its ends, and a reciprocating member operating upon said clamping member to cause it to grip the stud and move it into welding engagement with the contact element.

6. In a mechanism for welding contact elements to studs, a stationary electrode adapted to receive the contact element, a movable conducting member adapted to grip the stud between its ends, and a current carrying, reciprocating member adapted to engage the movable conducting member to clamp the stud and move it into welding engagement with the contact element.

7. In a mechanism for welding contact elements to studs, a stationary electrode adapted to receive a contact element, a movable member comprising pivotal sections adapted to hold the stud in welding position, and a reciprocating member adapted in its movement to engage one of said pivotal sections to clamp said stud and to move said movable member into welding position.

8. In a mechanism for welding contact elements to studs, a stationary member adapted to receive the contact element, a movable member comprising movable clamping jaws adapted to engage the stud between its ends, means for clamping said jaws to the stud and for moving said stud into welding engagement with the contact element, and means for releasing said jaws from said stud after the welding operation.

In witness whereof I hereunto subscribe my name this 17th day of April, A. D. 1920.

JAMES T. GRIFFIN.